United States Patent
Damon et al.

(10) Patent No.: US 6,826,761 B1
(45) Date of Patent: Nov. 30, 2004

(54) EFFICIENT TIMER MANAGEMENT SYSTEM

(75) Inventors: Philippe Damon, Carrboro, NC (US); Marco C. Heddes, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 09/675,545

(22) Filed: Sep. 28, 2000

(51) Int. Cl.[7] .............................. G06F 3/00; G06F 9/44; G06F 9/46; G06F 13/00
(52) U.S. Cl. ...................... 719/328; 719/310; 719/314; 719/329; 713/502
(58) Field of Search ................................. 719/310, 314, 719/328, 329; 709/310, 314, 320, 328

(56) References Cited

U.S. PATENT DOCUMENTS

| | | | |
|---|---|---|---|
| 5,621,892 A | 4/1997 | Cook et al. | 395/200.1 |
| 5,768,572 A * | 6/1998 | George et al. | 713/502 |
| 6,012,081 A * | 1/2000 | Dorn et al. | 709/102 |
| 6,078,747 A | 6/2000 | Jewitt | 395/712 |
| 6,349,388 B1 * | 2/2002 | Russell | 713/502 |
| 6,618,805 B1 * | 9/2003 | Kampe | 713/1 |

OTHER PUBLICATIONS

PCT International Search Report dated Sep. 11, 2003.

* cited by examiner

Primary Examiner—Thomas Lee
Assistant Examiner—Diem K. Cao
(74) Attorney, Agent, or Firm—Robert A. Voigt, Jr.; Winstead Seachrest & Minick P.C.

(57) ABSTRACT

A timer management system and method for managing timers in both a synchronous and asynchronous system. In one embodiment of the present invention, a timer management system comprises an application program interface (API) for providing a set of synchronous functions allowing an application to functionally operate on the timer. The timer management system further comprises a timer database for storing timer-related information. Furthermore, the timer management system comprises a timer services for detecting the expiring of the timer. A handle function of the timer services allows an asynchronous application, i.e., application in a multi-task system, to synchronously act on the timer. That is, when a timer in a asynchronous system times-out, the handle function allows the asynchronous application to act on the expired timer without incurring an illegal time-out message. In another embodiment of the present invention, a timer may be reinitialized from the same allocated block of memory used to create the timer. In another embodiment of the present invention, a time-out message may be sent using the same allocated block of memory used to create the timer.

34 Claims, 4 Drawing Sheets

EFFICIENT TIMER MANAGEMENT SYSTEM

TECHNICAL FIELD

The present invention relates to the field of managing timers in data processing systems, and more particularly to a timer management system that is used in both a synchronous and asynchronous system where an asynchronous application is synchronously acting on the timer in an asynchronous system and that allows a timer to be reinitialized without allocating new system memory.

BACKGROUND INFORMATION

A timer is a device which can be set to furnish an interrupt or a timeout indication at a specific time instant or after a selected time interval. Timers are required in data processing systems in which typical protocols require that a very large number of simultaneously occurring tasks or events be supervised to detect whether they occurred within predetermined delays. For example, a start operation may be sent by the application to start the timer in order to supervise a corresponding event. When the supervision of an event has to be interrupted for different reasons, a stop operation may be generated by the corresponding application. After a while, the supervision of the corresponding event may be requested to start again, in which case a start operation may be generated by the application. While the timer associated with an event is still running, the application may request a restart operation in order to delay the timing of the corresponding event.

A real-time operating system (RTOS), e.g., VxWorks™, OSE, Lynx, within a data processing system provides hardware resource management functions, e.g., memory management, task management, and data input/output management. The operating system may further include a user interface for handling a screen display and the manipulation of a mouse. The operating system may further include a module such as a timer management program, i.e., timer management system, for managing a plurality of timers that are started, stopped, idled, etc. by an application program in a data processing system. Application programs, e.g., word processing software, database software, software for calculation for tables, reside on top of the OS in the topmost layer of a hierarchial software arrangement.

Prior art timer management systems are used in either synchronous, i.e., single task, or asynchronous, i.e., multi-task, data processing systems. In a synchronous system, when the timer expires, the application, i.e., user of the timer, is notified by a message commonly referred to as a timer message. In an asynchronous system, when the timer expires, the timer message may be stored on queue before being sent to the application, i.e., user of the timer. If the application stops the timer prior to receiving a timer message, the timer moves back to the idle state. However, some operating systems do not allow timer messages to be removed from the queue when the application performs an operation on the expired timer prior to receiving the timer message. Subsequently, a special state-variable in the timer message denotes the fact that it is an illegal time-out message. In a synchronous system, this problem does not occur.

It would therefore be desirable to develop a timer management system that is used in both a synchronous and asynchronous system where an asynchronous application is synchronously acting on the timer in an asynchronous system. That is, it would therefore be desirable to develop a function of filter these illegal time-out messages that are transparent to the application. It would further be desirable to allow a timer to be reinitialized without allocating new system memory.

SUMMARY

The problems outlined above may at least in part be solved in some embodiments by a handle function that allows an asynchronous application in a multi-task system, i.e., asynchronous system, to synchronously act on the timer. That is, when a timer in an asynchronous system times-out, the handle function filters the illegal time-out messages by allowing the asynchronous application to synchronously act on the timer. In another embodiment of the present invention, a timer may be reinitialized from the same allocated block of memory used to create the timer. In another embodiment of the present invention, a time-out message may be sent using the same allocated block of memory used to create the timer.

In one embodiment, a timer management system for managing timers in both a synchronous and asynchronous system comprises an application program interface (API) for providing a set of synchronous functions allowing an application to functionally operate on the timer. The timer management system further comprises a timer database for storing timer-related information. Furthermore, the timer management system comprises a timer services for detecting the expiring of the timer. A handle function of the timer services allows the asynchronous application, i.e., application in an asynchronous system, to synchronously act on the timer. When the timer expires, the handle function of the timer services allows the asynchronous application to act on the expired timer without incurring illegal time-out messages.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a timer management system and method for managing timers in both a synchronous and asynchronous system. In one embodiment of the present invention, a timer management system comprises an application program interface (API) for providing a set of synchronous functions allowing an application to functionally operate on the timer. The timer management system further comprises a timer database for storing timer-related information. Furthermore, the timer management system comprises a timer services for detecting the expiring of the timer. A handle function of the timer services allows an asynchronous application, i.e., application in a multi-task system, to synchronously act on the timer. That is, when a timer in an asynchronous system times-out, the handle function allows the asynchronous application to act on the expired timer without incurring an illegal time-out message. In another embodiment of the present invention, a timer may be reinitialized from the same allocated block of memory used to create the timer. In another embodiment of the present invention, a time-out message may be sent using the same allocated block of memory used to create the timer.

Figure 1:
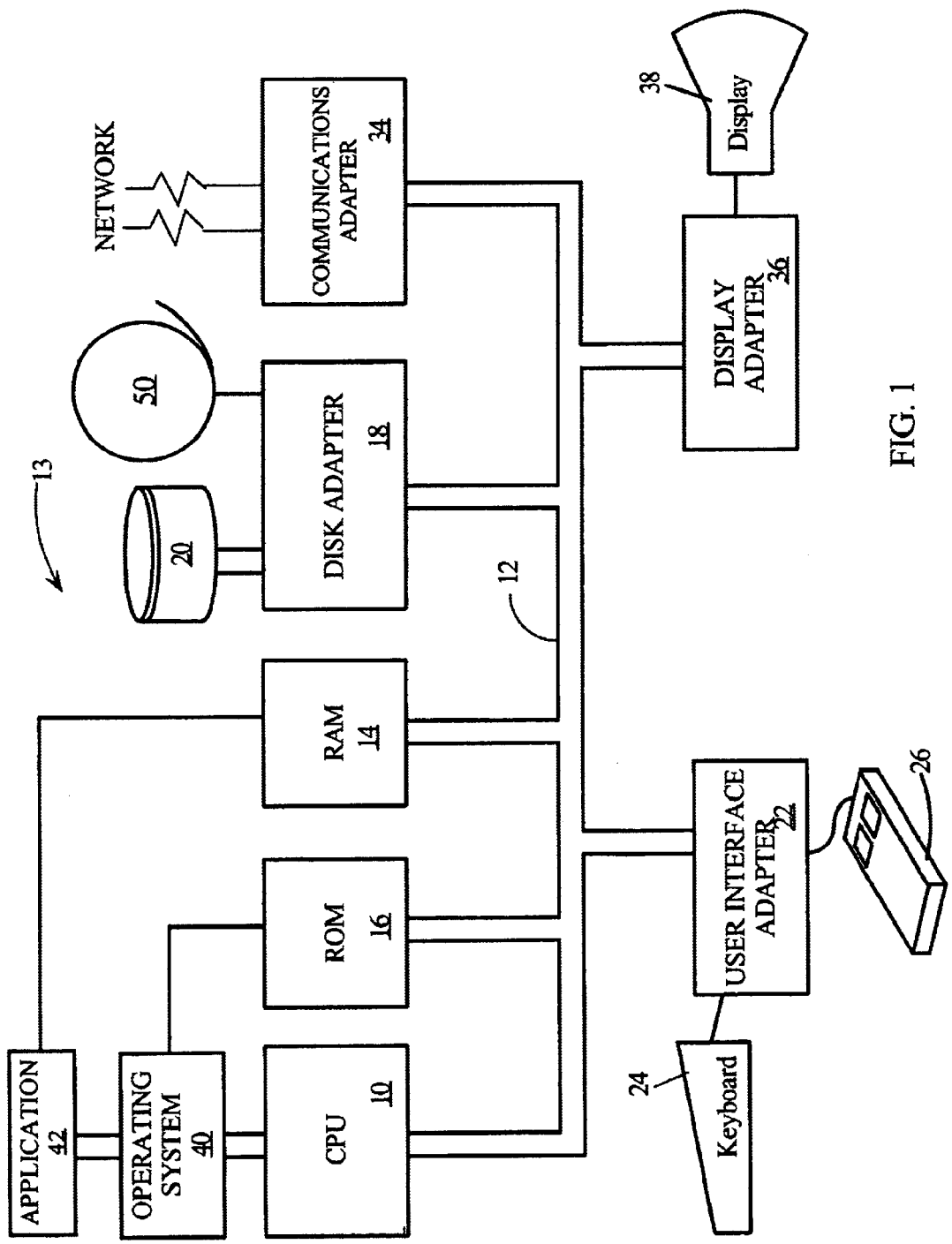
FIG. 1 illustrates a data processing system configured in accordance with the present invention.

FIG. 1—Computer System

FIG. 1 illustrates a typical hardware configuration of data processing system 13 which is representative of a hardware environment for practicing the present invention. Data processing system 13 has a central processing unit (CPU) 10, such as a conventional microprocessor, coupled to various other components by system bus 12. A real-time operating system 40, e.g., VxWorks™, OSE, Lynx, runs on CPU 10 and provides control and coordinates the function of the various components of FIG. 1. As stated in the Background Information section, a timer management program, i.e., timer management system, may reside in a module within the operating system 40. In another embodiment, an application 42, e.g., timer management system, may run in conjunction with operating system 40 and provide output calls to operating system 40 which implements the various functions to be performed by application 42. Read only memory (ROM) 16 is coupled to system bus 12 and includes a basic input/output system ("BIOS") that controls certain basic functions of data processing system 13. Random access memory (RAM) 14, I/O adapter IS, and communications adapter 34 are also coupled to system bus 12. It is noted that software components including operating system 40 and application 42 are loaded into RAM 14 which is the computer system's main memory. I/O adapter 18 may be a small computer system interface ("SCSI") adapter that communicates with disk units 20 and tape drives 50. Communications adapter 34 interconnects bus 12 with an outside network enabling data processing system 13 to communication with other such systems. Input/Output devices are also connected to system bus 12 via a user interface adapter 22 and a display adapter 36. A display monitor 38 is connected to system bus 12 by display adapter 36. In this manner, a user is capable of inputting to system 13 through a keyboard 24 or a mouse 26 and receiving output from system 13 via display 38.

Preferred implementations of the invention include implementations as a computer system programmed to execute the method or methods described herein, and as a computer program product. According to the computer system implementations, sets of instructions for executing the method or methods are resident in the random access memory 14 of one or more computer systems configured generally as described above. Until required by the computer system the set of instructions may be stored as a computer program product in another computer memory, for example, in disk drive 20 (which may include a removable memory such as an optical disk or floppy disk for eventual use in disk drive 20). Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 2:
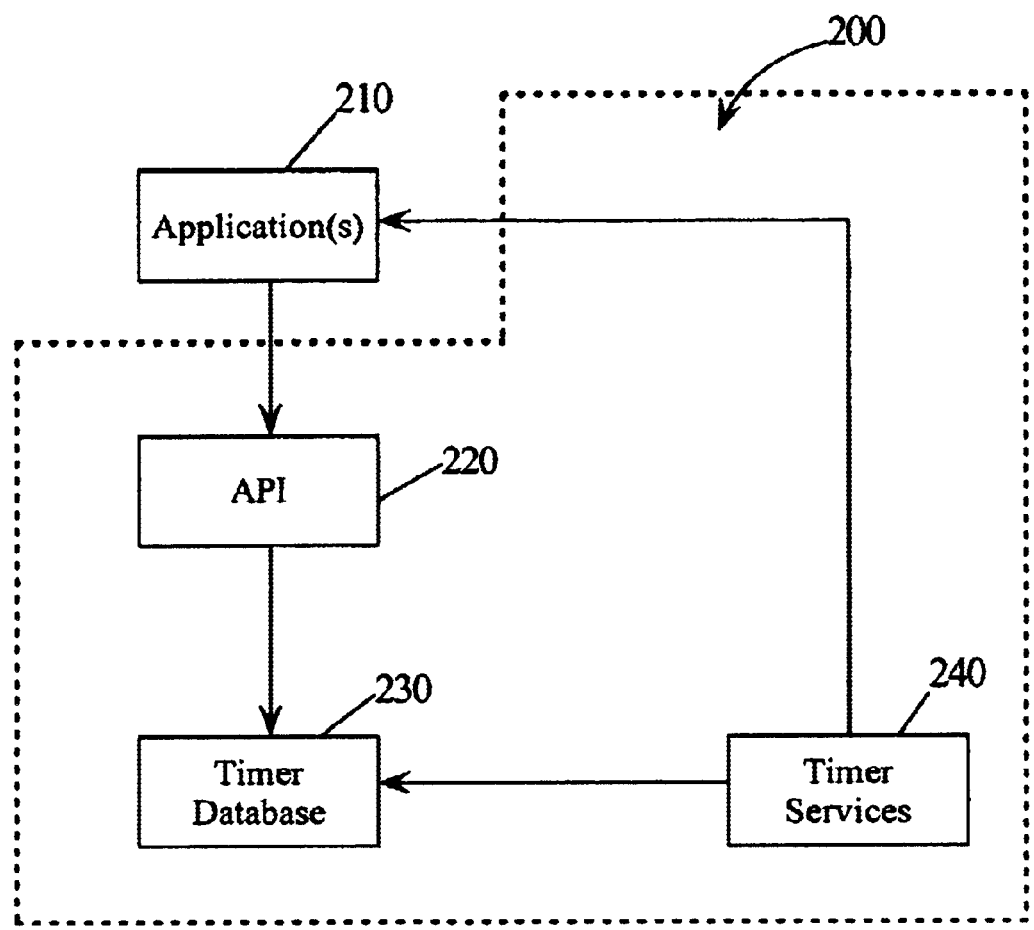
FIG. 2 illustrates an embodiment of a timer management system.

FIG. 2—Timer Management System

FIG. 2 illustrates an embodiment of a timer management system 200. As stated in the Background Information section, an operating system may include a module that comprises timer management system 200. The operating system typically resides within the kernal of data processing system 13. In another embodiment, timer management system 200 may be an application program residing in the topmost layer of a typical hierarchial software arrangement independent of the operating system.

Timer management system 200 comprises an application program interface (API) 220, a timer database 230 and a timer services 240. API 220 allows software application(s) 210 to functionally operate timers, e.g., start, stop, restart, delete, in data processing system 13. It is noted that for simplicity, software applications 210 that use timer management system services may be referred to as "users." API 220 provides a set of synchronous functions for creating, starting, stopping and deleting a timer. In one embodiment, API 220 may be a dynamic-link library (DLL) file. A DLL file is one that contains one or more functions that are compiled, linked and stored separately from application processes that use them, and exports code that may be shared among applications. Furthermore, the set of synchronous functions provided by API 220 allows user application(s) 210 to access timer database 230. Timer database 230 may be a repository for timer-related information, e.g., timer records for created timers. It is noted that timer database 230 may be structured in any form, e.g., link list, interval list.

Timer services 240, an OS task, detects the expiration of timers corresponding to each application 210 that has initiated a timer via API 220. Timer services 240 maintains timer database 230 as well as scans timer database 230 for expired timers. The scan of timer database 230 may be performed at regular time intervals. If the timer has expired, timer services 240 takes appropriate action depending on whether the timer management system is implemented in a single-task system or a multi-task system. In a single-task system, i.e., synchronous system, as will be described in further detail below, timer services 240 calls a time-out function to send a time-out message to user application 210. In a multi-task system, i.e., asynchronous system, as will be described in further detail below, timer services 240 sends a time-out message to the application's task if the timer has expired. The time-out message sent is the same block of memory as the block of memory allocated when the timer was created as will be further described in conjunction with FIG. 3. As stated in the Background Information section, the timer message may be stored on queue before being sent to application 210 in a multi-task system. If application 210 stops the timer prior to receiving a timer message, the timer moves back to the idle state. However, some operating systems do not allow timer messages to be removed from the queue when application 210 performs an operation on the expired timer prior to receiving the timer message. Subsequently, a special state-variable in the timer message denotes the fact that it is an illegal time-out message. A detailed explanation of timer management system 200 avoiding illegal time-out messages by allowing an asynchronous application 210 to synchronously act on the timer in an asynchronous system is provided below. Furthermore, a detailed explanation of timer management system 200 allowing a timer to be reinitialized without 59 allocating new system memory is provided below.

Figure 3:
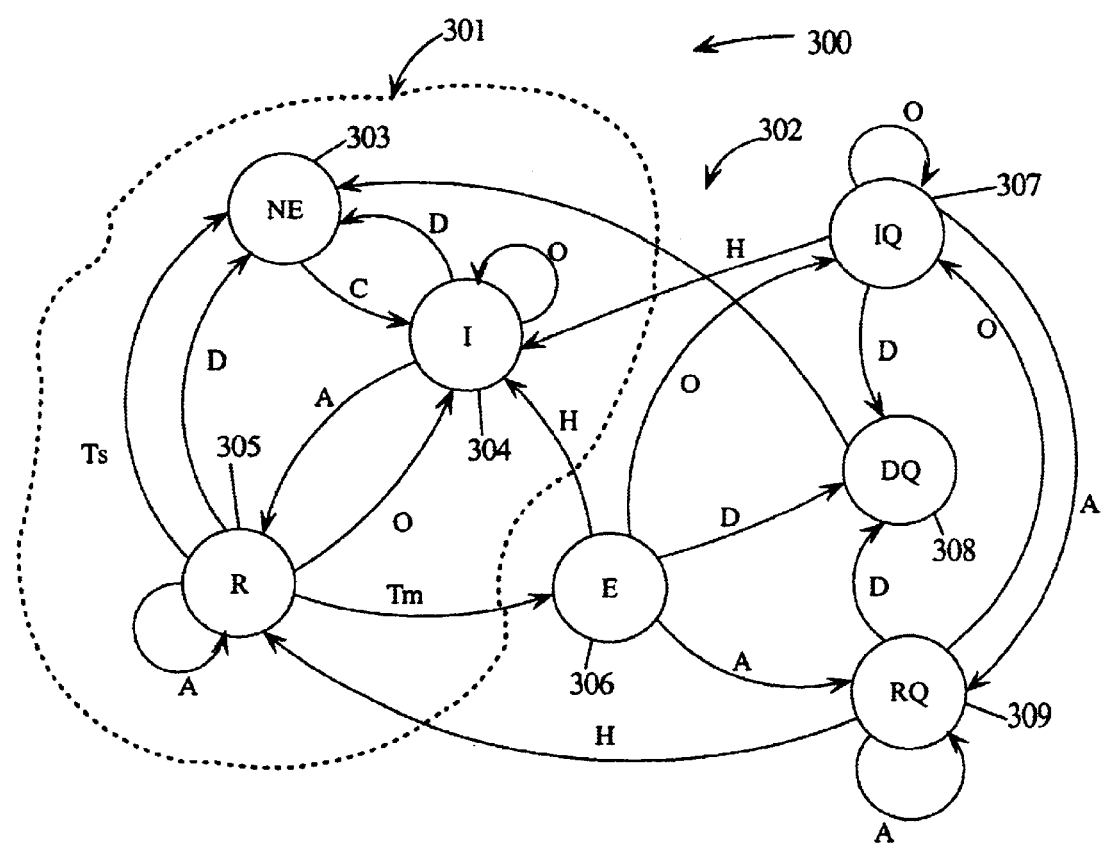
FIG. 3 is a state machine which illustrates a timer management system of the present invention where an asynchronous application is synchronously acting on the timer in an asynchronous system.

FIG. 3—State Machine Illustration of Timer Management System

FIG. 3 illustrates an embodiment of the present invention of a state machine 300 which may be used in the operation of timer management system 200 (see FIG. 2). State machine 300 depicts a timer management system 200 that manages timers for both a single task system, i.e., synchronous system, and a multi-task system, i.e., asynchronous system, concurrently. State machine 300 includes a single-task state machine 301 and a multi-task state machine 302. The states of the single-task state machine 301 comprise states 303, 304 and 305. The states of the multi-task state machine 302 comprise states 306, 307, 308 and 309.

Referring to FIG. 3, in conjunction with FIG. 2, state machine 300 remains in state 303, non-existent ("NE"), until a timer is created. That is, state 303 represents a state in which a timer is non-existent. When a timer is created ("C"), state machine 300 transitions from state 303 to state 304. State 304 represents a state in which a timer is created and ready to be initialized. That is, the timer is idle ("1"). In one embodiment, timer services 240 creates a timer out of a block of memory. The block of memory allocated for creating the timer may then be stored in timer database 230. A description of the block of memory allocated for creating the timer is provided below in connection with the data structure of the time-out message.

If the timer is deleted ("D") while in state 304, then state machine 300 transitions from state 304 to state 303. If the timer is activated ("A") while at state 304, then state machine 300 transitions from state 304 to state 305. State 305 represents a state in which the timer that was previously created is running ("R"). If the timer is deleted while at state 305, then state machine transitions from state 305 to state 303. If the timer that is running is stopped ("O"), then state machine 300 transitions from state 305 to state 304. If the timer is not deleted at state 304 but instead is activated, an the timer will be reinitialized, i.e., restarted, without allocating new system memory, i.e., using the same system memory. If the timer at state 305 expires, then a time-out message ("Ts") is notified synchronously to application 210 and state machine 300 transitions from state 305 to state 303.

Figure 4:
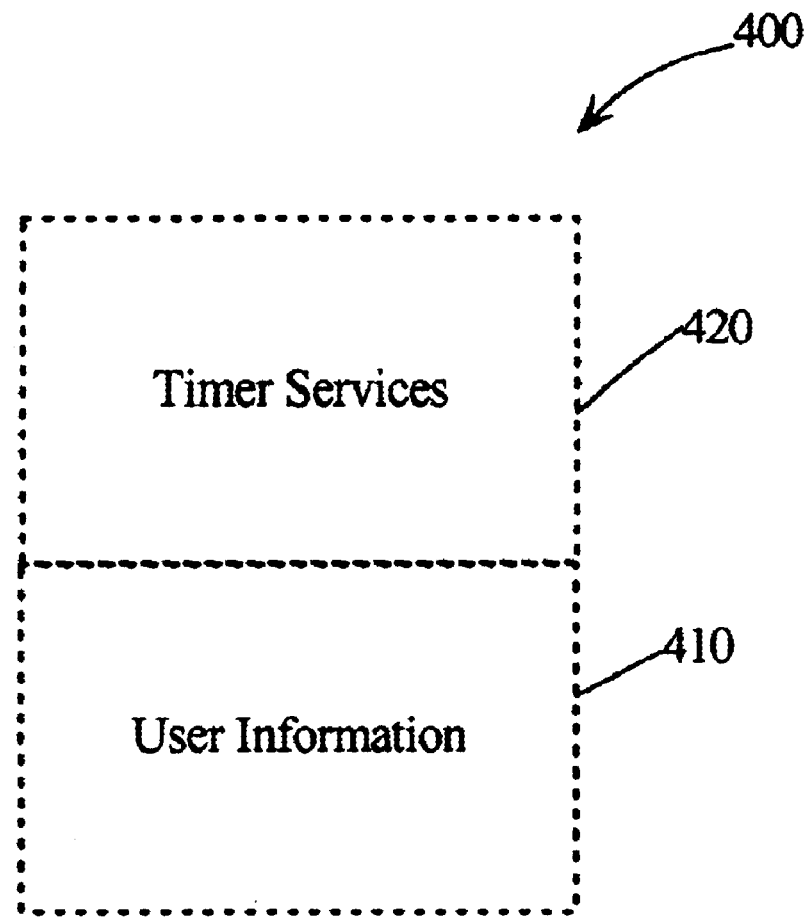
FIG. 4 illustrates an embodiment of a data structure of a time-out message.

As stated above, a time-out message sent is the same block of memory as the block of memory allocated when the timer was created. The reason is that the procedure that creates the timer creates extra memory space for use by timer services 240 which is not seen by application 210. A drawing of an embodiment of a data structure 400 of the time-out message is illustrated in FIG. 4. Referring to FIG. 4, a time-out message may comprise at least two distinct parts. An application part 410 may comprise information related to application 210. In a single-task system, the application part 410 may comprise the time-out function and a context field which are owned by application 210. In a multi-task system, the application part 410 may comprise the same context field as well as information necessary to identify application 210, e.g., queue to send the message, application task identification. A timer services part 420 may comprise some additional fields, e.g., pointers to memory addresses of timers stored in timer database 230. The timer services part 420 is not seen by application 210.

Referring to FIG. 3, in conjunction with FIG. 2, application 210 may erroneously believe that the timer is operating at a state in which it is not. For example, application 210 may mistakenly believe that the timer is running when the timer is in actuality idle at state 304. Application 210 may then stop the timer at the idle state which is represented by the arched line at state 304. Furthermore, application 210 may mistakenly believe that the timer is idle when the timer is in actuality running at state 305. Application 210 may then activate the timer at the running state which is represented by the arched line at state 305.

In multi-task system, i.e., asynchronous system, a time-out message is sent to the (J, application's task. As stated in the Background Information section, when the timer expires in an asynchronous system, the timer message may be stored on queue before being sent to application 210. If application 210 stops the timer prior to receiving a timer message, the timer moves back to the idle state. However, some operating systems do not allow timer messages to be removed from the queue when application 210 performs an operation on the expired timer prior to receiving the timer message. Subsequently, a special state-variable in the timer message denotes the fact that it is an illegal time-out message. A description of a process that filters these illegal time-out messages that are transparent to user application 210 is provided below.

In an asynchronous system, when the timer at state 305 expires, a time-out message ("Tm") is queued. In one embodiment, the time-out messages, Tm, may be stored in a system queue attached to application 210. It is noted that the queue storing the time-out messages, Tm, may be located anywhere in system memory. When the timer at state 305 expires in an asynchronous system, state machine 300 transitions from state 305 to state 306. State 306 is the expired state ("E") where the timer is not running and the time-out message, Tm, is queued. As soon as application 210 receives the time-out message, Tm, a handle function ("H") of timer services 240 transparent to application 210 allows application 210 in an asynchronous system to synchronously act on the timer. That is, the handle function transfers state machine 300 from a state in the multi-task state machine 302 to a state in the single-task state machine 301. For example, if application 210 receives the time-out message, Tm, when state machine is at state 306, then the handle function transfers state machine 300 from state 306 in the multi-task state machine 302 to the idle state 304 in the single-task state machine 301.

If the asynchronous application 210, i.e., application of an asynchronous system, has not received the time-out message, Tm, stored in a queue, e.g., a system queue attached to application 210, then asynchronous application 210 may not know that the timer has expired. Asynchronous application 210 may stop the timer erroneously believing that the timer is running. Asynchronous application 210 may then believe the timer is in the idle state as represented by a transition from state 306 to state 307. State 307 is the state ("IQ") in which the timer is in the idle state and the time-out message, Tm, is still queued. When the time-out message is dequeued, the handle function transparent to asynchronous application 210 transfers state machine 300 from state 307 in the multi-task state machine 302 to the idle state 304 in the single-task state machine 301. If while at state 306, asynchronous application 210 deletes the timer, then state machine 300 transitions from state 306 to state 308. State 308 is the state ("DQ") in which the timer is deleted and the time-out message, Tm, is still queued. When the time-out message is dequeued, the handle function transparent to asynchronous application 210 transfers state machine 300 from state 308 in the multi-task state machine 302 to the non-existent state 303 in the single-task state machine 301. If while at state 306, asynchronous application 210 activates the timer, then state machine 300 transitions from state 306 to state 309. State 309 is the state ("RQ") in which the timer is in the running state and the time-out message, Tm, is still queued. When the time-out message is dequeued, the handle function transparent to asynchronous application 210 transfers state machine 300 from state 309 in the multi-task state machine 302 to the running state 305 in the single-task state machine 301.

If while at state 307, asynchronous application 210 deletes the timer, then state machine 300 transitions from state 307 to state 308. When the time-out message is dequeued, the handle function transfers state machine 300 from state 308 in the multi-task state machine 302 to the non-existent state 303 in the single-task state machine 301. If while at state 307, asynchronous application 210 activates the timer, then state machine 300 transitions from state 307 to state 309. When the time-out message is dequeued, the handle function transparent to asynchronous application 210 transfers state machine 300 from state 309 in the multi-task state machine 302 to the running state 305 in the single-task state machine 301. It is noted that when the timer is reinitialized, i.e., restarted, in state 309, the timer uses the same allocated system memory as the system memory allocated when the timer was created in state 304.

If while at state 309, asynchronous application 210 stops the timer, then state machine 300 transitions from state 309 to state 307. When the time-out message is dequeued, the handle function transparent to asynchronous application 210 transfers state machine 300 from state 307 in the multi-task state machine 302 to the idle state 304 in the single-task state machine 301. If while at state 309, asynchronous application 210 deletes the timer, then state machine 300 transitions from state 309 to state 308. When the time-out message is dequeued, the handle function transparent to asynchronous application 210 transfers state machine 300 from state 308 in the multi-task state machine 302 to the non-existent state 303 in the single-task state machine 201.

As in the single-task state machine 301, asynchronous application 210 may erroneously believe that the timer is operating at a state in which it is not. For example, asynchronous application 210 may mistakenly believe that the timer is running when the timer is in actuality idle at state 307. Asynchronous application 210 may then stop the timer at state 307 which is represented by the arched line at state 307. Furthermore, asynchronous application 210 may mistakenly believe that the timer is idle when the timer is in actuality running at state 309. Asynchronous application 210 may then activate the timer at the running state which is represented by the arched line at state 309.

Although the timer management system and method of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A timer management system for managing timers in both a synchronous and asynchronous system comprising:
    an application program interface (API) providing a set of synchronous functions allowing an application to functionally operate a timer;
    a timer database for storing timer-related information; and
    a timer services detecting the expiring of said timer, wherein a handle function of said timer services allows said application to act on an expired timer without incurring an illegal time-out message.

2. The timer management system as recited in claim 1, wherein said application performs the following operations on said timer via said API:
    creating said timer from an allocated block of system memory,
    activating said timer; and
    reinitializing said timer using said allocated block of system memory.

3. The timer management system as recited in claim 1, wherein said application performs the following operation on said timer via said API:
    creating said timer from an allocated block of system memory; and
    activating said timer,
    wherein said timer expires and said timer services sends synchronously a time-out message to said application, wherein said time-out message is sent using said allocated block of system memory.

4. The timer management system as recited in claim 1, wherein said application performs the following operation on said timer via said API:
    creating said timer from an allocated block of system memory; and
    activating said timer;
    wherein said timer expires and said timer services sends a time-out message to a particular queue, wherein said timer is in an expired state in an asynchronous state machine.

5. The timer management system as recited in claim 4, wherein said particular queue is a system queue attached to said application.

6. The timer management system as recited in claim 4, wherein said application receives said time-out message, wherein said handle function transfers said timer from said expired state in said asynchronous state machine to an idle state in a synchronous state machine, wherein said handle function allows said application to synchronously act on said timer.

7. The timer management system as recited in claim 4, wherein said application stops said timer, wherein said timer is in an idle state in said asynchronous state machine with said time-out message being queued.

8. The timer management system as recited in claim 7, wherein said time-out message is dequeued, wherein said handle function transfers said timer from said idle state in said asynchronous state machine to an idle state in a synchronous state machine, wherein said handle function allows said application to synchronously act on said timer.

9. The timer management system as recited in claim 7, wherein said timer is deleted by said application, wherein said timer is in a state in said asynchronous state machine in which said timer is deleted and said time-out message is queued, wherein said time-out message is dequeued, wherein said handle function transfers said timer from said state in said asynchronous state machine in which said timer is deleted and said time-out message is queued to a non-existent state in a synchronous state machine, wherein said handle function allows said application to synchronously act on said timer.

10. The timer management system as recited in claim 7, wherein said timer is activated by said application, wherein said timer is in a running state in said asynchronous state machine with said time-out message being queued.

11. The timer management system as recited in claim 10, wherein said timer is deleted by said application, wherein said timer is in a state in said asynchronous state machine in which said timer is deleted and said time-out message is queued, wherein said time-out message is dequeued, wherein said handle function transfers said timer from said state in said asynchronous state machine in which said timer is deleted and said time-out message is queued to a non-existent state in a synchronous state machine, wherein said handle function allows said application to synchronously act on said timer.

12. The timer management system as recited in claim 10, wherein said timer is stopped by said application, wherein said timer is in said idle state in said asynchronous state machine with said time-out message being queued, wherein said time-out message is dequeued, wherein said handle function transfers said timer from said idle state in said asynchronous state machine to an idle state in a synchronous state machine, wherein said handle function allows said application to synchronously act on said timer.

13. The timer management system as recited in claim 10, wherein said time-out message is dequeued, wherein said handle function transfers said timer from said running state in said asynchronous state machine to a running state in a synchronous state machine, wherein said handle function allows said application to synchronously act on said timer.

14. The timer management system as recited in claim 4, wherein said application deletes said timer, wherein said timer is in a state in said asynchronous state machine in which said timer is deleted and said time-out message is queued, wherein said time-out message is dequeued, wherein handle function transfers said timer from said state in said asynchronous state machine in which said timer is deleted and said time-out message is queued to a non-existent state in a synchronous state machine, wherein said handle function allows said application to synchronously act on said timer.

15. The timer management system as recited in claim 4, wherein said application activates said timer, wherein said timer is in a running state in said asynchronous state machine with said time-out message being queued.

16. The timer management system as recited in claim 15, wherein said timer is deleted by said application, wherein said timer is in a state in said asynchronous state machine in which said timer is deleted and said time-out message is queued, wherein said time-out message is dequeued, wherein said handle function transfers said timer from said state in said asynchronous state machine in which said timer is deleted and said time-out message is queued to a non-existent state in a synchronous state machine, wherein said handle function allows said application to synchronously act on said timer.

17. The timer management system as recited in claim 15, wherein said timer is stopped by said application, wherein said timer is in an idle state in said asynchronous state machine with said time-out message being queued, wherein said time-out message is dequeued, wherein said handle function transfers said timer from said idle state in said asynchronous state machine to an idle state in a synchronous state machine, wherein said handle function allows said application to synchronously act on said timer.

18. The timer management system as recited in claim 15, wherein said time-out message is dequeued, wherein said handle function transfers said timer from said running state in said asynchronous state machine to a running state in a synchronous state machine, wherein said handle function allows said application to synchronously act on said timer.

19. The timer management system as recited in claim 1, wherein said API is a DLL file.

20. A method for managing timers in both a synchronous and asynchronous system comprising the steps of:

creating a timer from an allocated block of system memory by an application via an application program interface (API);

activating said timer;

expiring of said timer; and sending a time-out message to a particular queue when said timer expires, wherein said timer is in an expired state in an asynchronous state machine, wherein a handle function allows said application to act on said expired timer without incurring an illegal time-out message.

21. The method as recited in claim 20, wherein said particular queue is a system queue attached to said application.

22. The method as recited in claim 20 further comprising the step of:

receiving said time-out message by said application, wherein said handle function transfers said timer from said expired state in said asynchronous state machine to an idle state in a synchronous state machine, wherein said handle function allows said application to synchronously act on said timer.

23. The method as recited in claim 20 further comprising the step of:

stopping said timer by said application, wherein said timer is in an idle state in said asynchronous state machine with said time-out message being queued.

24. The method as recited in claim 23, wherein said time-out message is dequeued, wherein said handle function transfers said timer from said idle state in said asynchronous state machine to an idle state in a synchronous state machine, wherein said handle function allows said application to synchronously act on said timer.

25. The method as recited in claim 23 further comprising the step of:

deleting said timer by said application, wherein said timer is in a state in said asynchronous state machine in which said timer is deleted and said time-out message is queued, wherein said time-out message is dequeued, wherein said handle function transfers said timer from said state in said asynchronous state machine in which said timer is deleted and said time-out message is queued to a non-existent state in a synchronous state machine, wherein said handle function allows said application to synchronously act on said timer.

26. The method as recited in claim 23 further comprising the step of:

activating said timer by said application, wherein said timer is in a running state in said asynchronous state machine with said time-out message being queued.

27. The method as recited in claim 26 further comprising the step of:

deleting said timer by said application, wherein said timer is in a state in said asynchronous state machine in which said timer is deleted and said time-out message is queued, wherein said time-out message is dequeued, wherein said handle function transfers said timer from said state in said asynchronous state machine in which said timer is deleted and said time-out message is queued to a non-existent state in a synchronous state machine, wherein said handle function allows said application to synchronously act on said timer.

28. The method as recited in claim 26 further comprising the step of:

stopping said timer by said application, wherein said timer is in said idle state in said asynchronous state machine with said time-out message being queued, wherein said time-out message is dequeued, wherein said handle function transfers said timer from said idle state in said asynchronous state machine to an idle state in a synchronous state machine, wherein said handle function allows said application to synchronously act on said timer.

29. The method as recited in claim 26, wherein said time-out message is dequeued, wherein said handle function transfers said timer from said running state in said asynchronous state machine to a running state in a synchronous state machine, wherein said handle function allows said application to synchronously act on said timer.

30. The method as recited in claim 20 further comprising the step of:

deleting said timer by said application, wherein said timer is in a state in said asynchronous state machine in which said timer is deleted and said time-out message is queued, wherein said time-out message is dequeued, wherein said handle function transfers said timer from said state in said asynchronous state machine in which said timer is deleted and said time-out message is queued to a non-existent state in a synchronous state machine, wherein said handle function allows said application to synchronously act on said timer.

31. The method as recited in claim 20 further comprising the step of:

activating said timer by said application, wherein said timer is in a running state in said asynchronous state machine with said time-out message being queued.

32. The method as recited in claim 31 further comprising the step of:

deleting said timer by said application, wherein said timer is in a state in said asynchronous state machine in which said timer is deleted and said time-out message is queued, wherein said time-out message is dequeued, wherein said handle function transfers said timer from said state in said asynchronous state machine in which said timer is deleted and said time-out message is queued to a non-existent state in a synchronous state machine, wherein said handle function allows said application to synchronously act on said timer.

33. The method as recited in claim 31 further comprising the step of:

stopping said timer by said application, wherein said timer is in an idle state in said asynchronous state machine with said time-out message being queued, wherein said time-out message is dequeued, wherein said handle function transfers said timer from said idle state in said asynchronous state machine to an idle state in a synchronous state machine, wherein said handle function allows said application to synchronously act on said timer.

34. The method as recited in claim 31, wherein said time-out message is dequeued, wherein said handle function transfers said timer from said running state in said asynchronous state machine to a running state in a synchronous state machine, wherein said handle function allows said application to synchronously act on said timer.

* * * * *

UNITED STATES PATENT AND TRADEMARK OFFICE
CERTIFICATE OF CORRECTION

PATENT NO.    : 6,826,761 B1
DATED         : November 30, 2004
INVENTOR(S)   : Philippe Damon and Marco C. Heddes It is certified that error appears in the above-identified patent and that said Letters Patent is hereby corrected as shown below:

Column 6,
Line 6, before "application's" please delete "(J,".

Column 8,
Line 14, following "timer" please replace "," with -- ; --.

Signed and Sealed this

Seventeenth Day of May, 2005

JON W. DUDAS
*Director of the United States Patent and Trademark Office*